(12) United States Patent
Rosefsky

(10) Patent No.: US 6,431,926 B1
(45) Date of Patent: Aug. 13, 2002

(54) RIBBON DRIVE PROPULSION SYSTEM AND METHOD

(76) Inventor: Jonathan B. Rosefsky, 251 W. Montgomery Ave., Haverford, PA (US) 19041

( * ) Notice: Subject to any disclaimer, the term of this patent is extended or adjusted under 35 U.S.C. 154(b) by 0 days.

(21) Appl. No.: 09/628,954

(22) Filed: Jul. 29, 2000

Related U.S. Application Data (60) Provisional application No. 60/146,122, filed on Jul. 29, 1999.

(51) Int. Cl.[7] ................................................. B63H 1/26
(52) U.S. Cl. ................................ 440/48; 440/49; 440/50
(58) Field of Search .............................. 440/38, 48, 49, 440/50; 114/61.1

(56) References Cited

U.S. PATENT DOCUMENTS

| | | | | |
|---|---|---|---|---|
| 119,155 A | | 9/1871 | Kolb | |
| 475,826 A | | 5/1892 | Street | |
| 1,112,057 A | * | 9/1914 | Dudash ........................ | 440/48 |
| 1,549,608 A | | 8/1925 | Raynes | |
| 2,083,959 A | * | 6/1937 | McMullen ................... | 440/48 |
| 2,320,451 A | * | 6/1943 | Akins .......................... | 440/48 |
| 2,568,903 A | | 9/1951 | Vassar ......................... | 115/34 |
| 2,655,890 A | * | 10/1953 | Whipple ...................... | 440/48 |
| 2,656,809 A | | 10/1953 | Frasure ....................... | 114/151 |
| 3,070,061 A | | 12/1962 | Rightmyer .................. | 115/34 |
| 3,141,439 A | | 7/1964 | Liston ......................... | 115/16 |
| 3,299,821 A | | 1/1967 | Silvern ........................ | 103/88 |
| 3,369,514 A | * | 2/1968 | Cockerell .................... | 440/50 |
| 3,441,088 A | | 4/1969 | Levy ........................... | 170/156 |
| 3,482,402 A | | 12/1969 | Anthoney, Sr. ............. | 60/221 |
| 3,737,249 A | | 6/1973 | Cooper ........................ | 416/179 |
| 3,796,508 A | | 3/1974 | Rowley ....................... | 415/72 |
| 4,222,231 A | | 9/1980 | Linn ............................ | 60/39.45 |
| 4,373,919 A | | 2/1983 | Stangeland ................. | 440/47 |
| 4,634,389 A | | 1/1987 | Eptaminitakis ............. | 440/53 |
| 5,181,868 A | | 1/1993 | Gabriel ....................... | 440/38 |
| 5,240,374 A | | 8/1993 | Speer .......................... | 416/140 |
| 5,244,425 A | | 9/1993 | Tasaki et al. ................ | 440/47 |
| 5,265,549 A | * | 11/1993 | Cernier ....................... | 114/61.1 |
| 5,292,270 A | | 3/1994 | Tucker et al. ............... | 440/82 |
| 5,324,216 A | | 6/1994 | Toyohara et al. ............ | 440/47 |
| 5,383,802 A | | 1/1995 | Nicholson ................... | 440/38 |
| 5,417,597 A | | 5/1995 | Levedahl .................... | 440/6 |
| 5,558,509 A | | 9/1996 | Jirnov et al. ................ | 418/15 |
| 6,213,042 B1 | * | 2/2001 | Delfosse .................... | 114/61.1 |

FOREIGN PATENT DOCUMENTS

| | | |
|---|---|---|
| DE | 298 12 429 | 7/1999 |
| EP | 0 480 501 A1 | 9/1991 |
| FR | 490000 | 11/1917 |
| FR | 757.930 | 10/1932 |
| FR | 775.605 | 6/1934 |
| FR | 467393 | 7/1946 |
| FR | 2.160.692 | 10/1971 |
| FR | 2 749 558 | 7/1996 |
| GB | 471671 | 2/1936 |
| GB | 2 301 399 | 4/1996 |
| JP | 5-294282 | 5/1993 |
| JP | 6-191482 | 6/1994 |
| WO | WO 87/01353 | 12/1987 |
| WO | WO 95/23088 | 8/1995 |
| WO | WO 95/24562 | 9/1995 |

* cited by examiner

Primary Examiner—S. Joseph Morano
Assistant Examiner—Lars A. Olson
(74) Attorney, Agent, or Firm—Roberts, Abokhair & Mardula, LLC (57) ABSTRACT

A ribbon drive propulsion apparatus and method for waterborne vessels such as surface craft and submersibles is disclosed. The vessel is equipped with an extended tube having an intake at a first end and an outlet at a second end. A ribbon formed of helical coils is mounted in the tube for rotation and the frequency of the coils decreases from the first end to the second end of the tube. Water is collected at the first end, an axial component of momentum of the water is increased via the rotating ribbon, and the water is ejected from the second end to provide propulsion to the vessel.

43 Claims, 6 Drawing Sheets

RIBBON DRIVE PROPULSION SYSTEM AND METHOD

RELATIONSHIP TO PRIOR APPLICATIONS

This application claims the benefit of U.S Provisional Application No. 60/146,122, filed Jul. 29, 1999.

FIELD OF THE INVENTION

This invention relates generally to propulsion systems for surface and subsurface vessels. More particularly, the present invention is a ribbon drive shaped as a spiral ribbon of decreasing helix angle and coil frequency within a cylinder or along the interior wall of a tubular conduit for causing water or other fluids to move with respect to the vessel when the ribbon is rotated.

BACKGROUND OF THE INVENTION

Propulsion systems for marine vessels have long been the subject of various inventions. For example, U.S. Pat. No. 475,826 to Street et al. was issued for a new form of screw propeller. The propeller was enclosed in a tube and gave water entering the tube a sternward direction. In this instance, the ribbon, surrounding a central shaft, was not of uniform diameter. However, water velocity was unaffected by this invention since the frequency of the repeating curved units of the ribbon is the same along the length of the shaft.

U.S. Pat. No. 2,568,903 to Vasser was issued for a propeller construction for watercraft. This invention describes a plurality of blades inside a cylinder, the blades having an inclined helical configuration. However, the frequency of the helical inclined blades is the same over the length of the cylinder. Thus, there is no augmented, incremental acceleration of water through the structure.

U.S. Pat. No. 3,070,061 to Rightmyer was issued for a progressive thrust propeller. This invention shows a continuous vane running along the length of a shaft. However, in this instance, the frequency of the vane along the length of the shaft varies from a higher frequency in the bow direction to a lower frequency in the stern direction. Since this invention is not encased in a tube, water will be pushed sideways away from the spinning vane, thereby losing a certain amount of the potential forward thrust for the vessel.

Certain other patents simply involve propellers of various types encased in tubes. For example, U.S. Pat. No. 5,244,425 to Tasaki et al. and U.S. Pat. No. 5,324,216 to Toyohara et al. were both issued for water-jet type units, which were units with a single curve encased in tubes.

U.S. Pat. No. 5,383,802 to Nicholson was issued for a propulsion system. The system comprises a series of separate vanes on the inside periphery of a cylinder, thereby leaving a hollow central core. When the cylinder is turned, water is drawn into the cylinder and expelled in the sternward direction, thus giving a forward propulsion to the vessel. These vanes on the inside of the cylinder are, however, generally the same frequency along the length of the propulsion cylinder, and are not continuous, thus lacking the continuous application of energy transferred to water by unitary ribbon, and perhaps being likely to produce more noise as each vane cleaves the water.

While these various systems represent certain inventive approaches to propulsion of vessels, when used in submarines or torpedoes the drive systems of such vehicles is a major source of noise production. When noise is produced in an underwater environment, detection is possible. Hence, there is a premium placed upon drive systems, especially for submarines, that allow such vessels to be driven in relative secrecy and silence.

In submarine systems, the various components have been designed to operate as quietly and as vibration-free as possible. This applies to propulsion systems as well as to the systems of fans, pumps, and other mechanical and energy transfer systems that operate within the submarine hull. In addition, hull designs have been optimized for a combination of speed, maneuverability, and quietness depending on the particular intended use. For any of these uses, the power of the propulsion device is critical, and noise suppression of the propulsion device is of equal concern. Thus, there is a continuing trend and balance that must be struck to allow a submersible to move as quickly as possible with the minimum amount of noise.

What would therefore be useful is a new propulsion system for surface vessels and for submarines in particular, which allows an increased speed of the vessel, as well as a decrease in any noise created by the propulsion system when operating in a subsurface mode.

The present invention is just such a system that differs markedly from these above inventions. The present invention generally comprises a ribbon drive of progressively decreasing coil frequency and several alternative embodiments enclosed in a propulsion tube, thereby giving directed and more effective forward motion to the vessel in a fluid environment such as water, while operating quietly and efficiently with an acoustic advantage.

SUMMARY OF THE INVENTION

As will be explained in more detail below, the present invention is a ribbon drive propulsion system and method, in several different embodiments, which allows water to be moved in channels (referred to herein as a propulsion tube) inside or adjacent to a hull, in an extremely efficient and quiet manner.

It is therefore an objective of the present invention to have a surface vessel or submarine with an improved propulsion system that is both faster and quieter than other existing systems.

It is a further objective of the present invention to create a propulsion system that operates within the hull of a submarine or surface vessel, rather than outside the hull as propellers of current systems operate.

It is a further objective of the present invention to apply a novel propulsion system to both submarines and to torpedoes, and surface vessels of all types.

The ribbon drive of the present invention comprises a series of alternative embodiments, all of which share a common concept, that is, a ribbon-like curved shape, composed of metal or other suitable material, attached either to a central axle, or alternatively to the inner surface of a cylinder or cone revolving within a tube-like space. Two or more parallel ribbon drives may be required within each cylinder or cone, to maximize balance and to minimize vibrations of a ribbon drive unit. Additionally, it is preferable to employ the drives in conter-rotating pairs so as to cancel torsional forces on the vessel.

A key element of both the central and peripheral designs of the ribbon drive is that there is a change in the frequency of curves of the ribbon drive, which proceeds from a high frequency (i.e. many coils per unit length) to a low frequency of coils per unit length with an associatated decrease in helix angle of the ribbon-like band when viewed lateral to the axis. For example, in lateral appearance, the ribbon drive would present a tight curved helix angle, which would be nearly perpendicular to the axial flow of water entering the ribbon drive, changing/progressing rearward to a more gradual curve at a helix angle of approximately 30 degrees to the axis, although this is not meant as a limitation since other angles may also prove beneficial.

The initial tight curves of the ribbon drive draws in fluid, such as water, from all directions in front of the intake. This water has initial velocities with high radial/circumferencial components and an initial axial component. The rotating ribbon drive imparts forces on the water and the decreasing frequency of the ribbon drive changes both the direction of the applied force and the resulting water velocity. The result is a higher axial velocity component for the water at the outlet, thereby increasing the axial component of momentum in order to drive the vehicle in an axial direction.

Assume that a fluid, such as water, is moving along at a rate of speed "a." Initial energy is imparted to water moving along the central linear axis of the ribbon drive by a high frequency coil. The amount of energy depends upon the revolutions per minute (R.P.M.) of the central linear shaft and thus of each coil of the helical shape. A unit of water upon exiting coil HF#1 (high frequency, 1st coil) is moving at velocity "a+1. " If a second, identical subsequent coil HF#2 is turning at the same rate as HF#1, then it too,can only add "1" to initial velocity "a"—not "1" to "a+1"— because HF#2 and HF#1 would be rotating at the same speed. Further, having the same helix angle at HF#2 would even act to impede the rapid passage of water moving at "a+1" having exited from HF#1, rather than to facilitate the water passage with a less steep helix angle. Increasing the frequency of HF-#2 (making it a tighter coil, with a steeper helix angle) would make it act more like a wall than a water conduit, while rotating on the same shaft as HF#1 . Therefore, the coil at an HF#2 position, rotating on the same shaft and at the same RPM as HF#1, must be a coil of lower frequency than HF#1, said second coil now called MF#1 ($1^{st}$ middle frequency coil).

A unit of energy initiated at the front edge of HF#1, by the rotation of the ribbon drive, is transferred to move water along the edge of its relatively vertical ribbon-like band/vane, with a small net increase in the axial velocity. The unit of energy next reaches MF#1 coil, moving along the edge of the more spread-out coil of the vane, traveling a greater distance along the edge of the vane in MF#1 compared to HF#1 per rotation. Therefore the unit of energy travels faster axially since a 360 degree curve of the MF#1 coil is more spaced out, stretched out as it were, along the central axle.

The unit of energy is imparted to unit volumes of water (for discussion purposes) moving rearward through the ribbon drive. The energy is applied at a constant rate (all coils turning at the same RPM) but along a constantly longer path. That longer path accommodates the unit of water moving at "a+1" because the vane face is less vertical than at HF#1, the vane edge is less vertical/more horizontal in MF#1 (the second coil in a ribbon drive propulsion system), with the unit of energy moving faster axially. Similar reasoning applies to the subsequent low frequency curve LF#1, the final curve or coil in a 3-coil setup.

Considereing a unit volume of water exiting from HF#1 at velocity "a+1," it is then exposed to additional rotating coil faces which must be less angled to accommodate the increased velocity imparted by HF#1. The result is that energy is increasingly imparted to an initial volume of fluid as it moves rearward in the ribbon drive propulsion tube at an ever increasing axial velocity.

Since water is contained within the cylinder of a ribbon drive propulsion system, its velocity through the cylinder (rotating at a constant R.P.M.) should progressively increase, with the volume exiting the rear being limited by the net water intake in the forward half, and the diameter of the exit outlet. Negative internal pressures found to be present (experimentally) in the forward half tend to support the theory of increasing velocity along the ribbon drive unit interior.

Coil frequencies and axial lengths can be optimized. Coils, divided into separate sections and arranged in series, can also be rotated at different RPM's (by separate drive means) to achieve optimal output. The lead HF#1 coil can be designed to fold away from the water path, such as by the iris-fan embodiment discussed below.

As noted above, there are two general embodiments of the ribbon drive propulsion system of the present invention. The first alternative embodiment is the central design concept. The central design is generally helical and looks similar to a corkscrew, but significantly different, having an increasingly stretched out frequency of coils (i.e., an increasing screw pitch). The band-like surface of the ribbon shape forces water to be angled rearward and outward from the central linear axle. Since the central linear axle operates within a propulsion tube, the water is contained and forced backward to propel the vessel (e.g. surface vessel or submarine) forward.

In practice, the band-like surface of the ribbon is preferably cupped, to provide an inward angle for the band-like ribbon surface. This helps limit the centrifugal effect of the ribbon drive, which tends to impel water outward toward the wall of the cylindrical tube in which the central linear axle is located. In addition, this cupped ribbon surface directs water more in a rearward direction, with less water angled off the ribbon material to the walls of the propulsion tube.

To assist in preventing cavitation of the water, slipstream inlet channels can be added in the low pressure regions. Since water is not compressible, the ribbon drive propulsion system does not pretend to compress the water, but rather to hasten its exit rearward by not impeding further rearward flow while simultaneously adding more "push" from the decreasing frequency design of the vane coils. Further, the converse of compression is expansion, which water cannot do, either. Because water does not expand at the side of a propeller blade that is pushing/corkscrewing water toward the rear, air bubbles tend to form in the areas where there is decreased or negative pressure due to water being accelerated rearward, creating a shear within the water.

Slipstream channels will help prevent such cavitation by providing additional water (ducted from the outer surface of the hull or propulsion tube) to that area in the drive stream where negative pressure exists immediately rearward of the first coil turn in the ribbon drive. The slipstream channels thus may provide the following advantages, particularly in a ribbon-drive propulsion system type of model: decreased bubble formation or cavitation, increased volume of water ejected rearward/increased thrust, and possibly improved water flow at the hull surface boundary layer.

In the second alternative embodiment, the ribbon-like band is attached peripherally to the inside surface of a propulsion tube or of a series of peripheral rings. In this instance, the entire cylinder rotates, and the coils of the ribbon band on the periphery of the interior of the tube cause water to be angled rearward, as well as toward the center, i.e. the central linear axis, of the cylindrical tube. The ribbon-like band attached to the periphery of the inside of the propulsion tube of the peripheral design may be a single continuous ribbon-like band. Alternatively, the first coil (HF#1) of the "band" may be an "iris-fan" formed by a series of rotatable blades all in one plane at the intake end of the cylinder. Each blade may be "feathered" or angled to adjust the angle of attack. These blades may also be radially retractable with respect to the cylinder to varying degrees (like the iris of a camera) in order to maximize the velocity of the water being propelled through the cylinder, and once thay have initiated water movement rearward through the ribbon drive, these blades can be completely retracted from the water channel and their rotation stopped.

DETAILED DESCRIPTION OF THE INVENTION

Figure 1A:
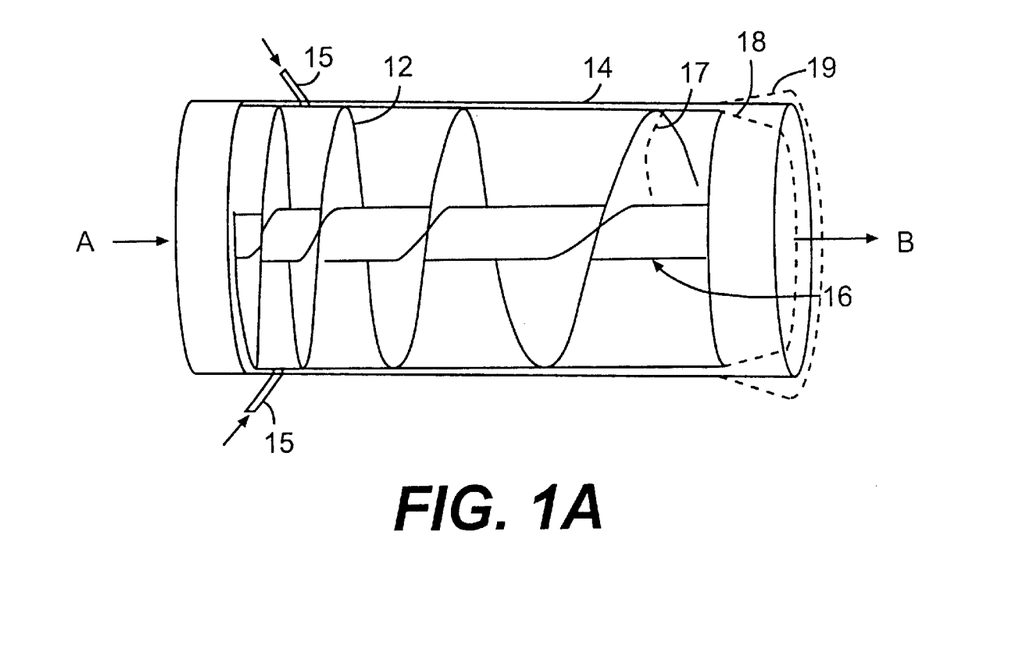
FIGS. 1A–1C illustrate various central design embodiments of the propulsion system.

Referring to FIG. 1A, the central linear axle (central design) concept is illustrated. The central axle 10 has a ribbon 12 attached to it. Visually, this representation appears much like the thread of a screw attached to a central core. The central design rotates within a propulsion tube 14. Water flows through the propulsion system in the direction of the arrow as the entire corkscrew-like design rotates within the propulsion tube 14.

Water initially enters the propulsion tube at point A and is initially propelled down the tube up to a speed limited by virtue of the high frequency of the coil at the beginning of the tube. However, to accept each initial unit volume of water which has been sped up by the initial high frequency coil, the frequency of the subsequent coil and the associated helix angle of the ribbon/vane decrease, thereby imparting additional velocity to the water as it exits from the tube at point B.

Slipstream channels 15 can be used to add more thrust and prevent cavitation. The entry angle of these slipstream channels 15 is preferrably set tangentially, aimed in the internal fluid flow direction so as to cause as little interruption to the ribbon-induced flow, but this is not meant as a limitation and other arrangements are also possible. The flow through the channels 15 can be induced by the low pressure region or can be caused by external pumps. Utilizing pumps at the startup of the ribbon drive rotation will assist in initiating rotation by the finite thrust of this channeled water on the vane.

As shown at 17, the vane can have a cupped, concave cross-section to assist in directing the water rearward. Additionally, the cross-section of the propulsion tube can be narrowed 18 or increased 19 for various purposes. For example, a narrowed exit can assist in preventing cavitation by increasing backpressures and an increased section of tube extending beyond the ribbon can reduce the tendency for the water to exit the tube tangentially.

The ribbon drive method/process becomes clearer when considering that if an accelerated unit volume of water were moving at, e.g., 10 feet/second, and contacted a subsequent coil of the same frequency/angle/tightness of curve, that coil would act to inhibit the flow of accelerated water unless that subsequent coil were turning at an even higher number of revolutions per minute to accommodate the increased velocity imparted to exiting water by the preceding coil. However, being within the same spinning containment tube turning at the same rate, e.g., 400 RPM, the second coil cannot rotate at a higher RPM. On the other hand, if the second coil has a lower frequency than the first coil, it will transfer additional energy to the already accelerated unit volume of water, resulting in an exit velocity after the second coil of, say, 12 or 14 feet/second. Thus the frequency/angle/tightness of curve of the subsequent sections decreases, thereby imparting additional velocity to the water as it exits from the tube at point B.

Figure 1B:
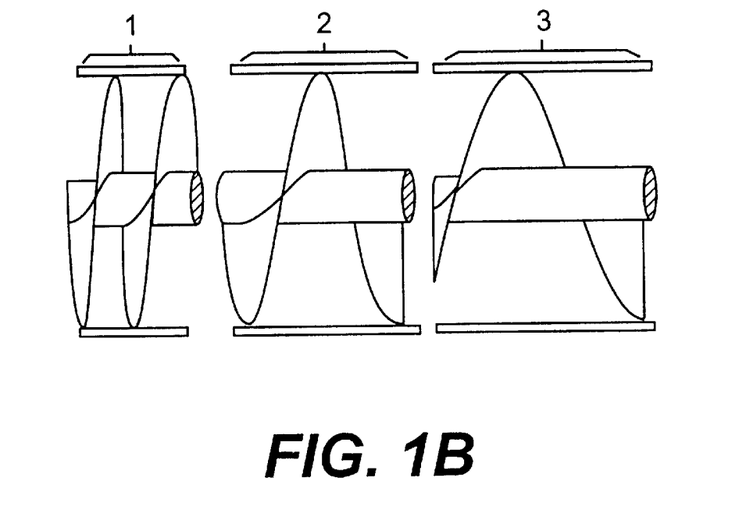

The frequency of each coil and the distance between the coils can be optimized by design, whether fixed in a unitary, single ribbon design or segmented into plural stages. If subsequent coils of lower frequency are rotated in separate sections 1, 2, and 3 at separate RPM's as illustrated in FIG. 1B, additional energy savings and increases in velocity and volume can be attained by allowing the rotation rates of subsequent sections to be tailored for optimum or maximum performance. This plural section arrangement is equally applicable to the other ribbon drive embodiments disclosed herein.

Figure 1C:
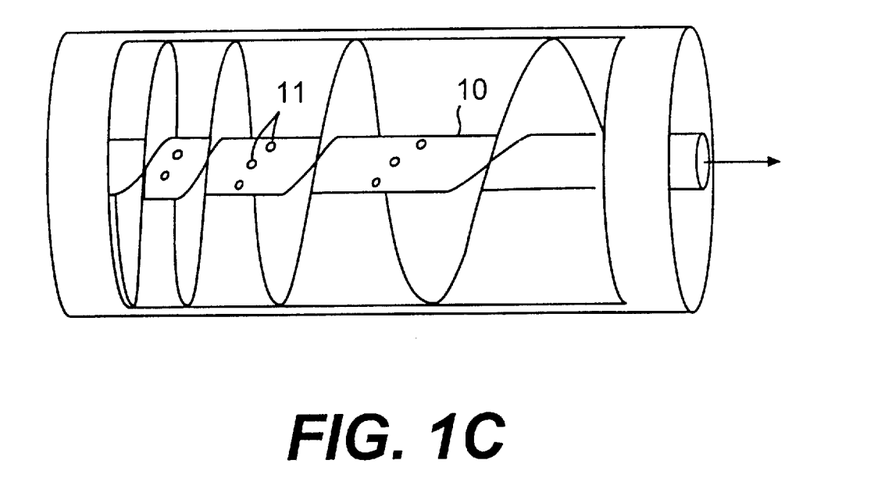

Within the propulsion tube 14', the central axle 10' may be made hollow with spaced openings 11, as illustrated in FIG. 1C, so as to be open to water flow from the entry point A. This central flow of water, like the slipstream channels above, can accommodate the need for additional water to fill the virtual space vacated by water (thought of as a unit volume for demonstration purposes) which has been sequentially accelerated rearward. The central opening formed by a hollow axel 10' allows for a certain amount of pressure equalization that helps to suppress cavitation.

Figure 2:
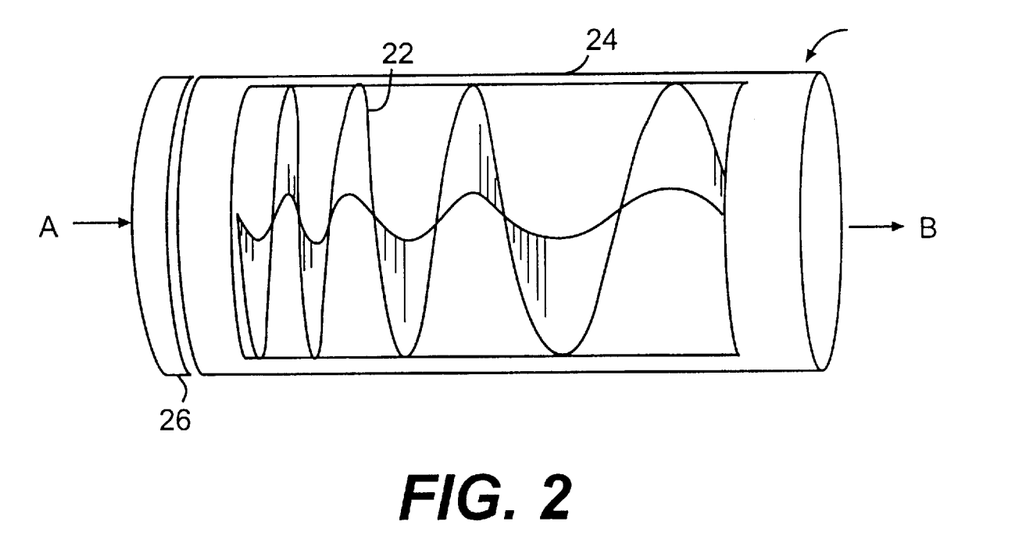
FIG. 2 illustrates, with a diagram of decreasing frequency and helix angle of coils, the peripheral design of the present invention.

Referring to FIG. 2, the decreasing frequency and helix angle of the coils of the peripheral design is illustrated. In this instance, the ribbon drive is attached to the interior periphery of a spinning propulsion tube 24 (or a series of peripheral rings whether the ribbon drive is continuous or is segmented like FIG. 1B). Ribbon 22 again has a high frequency at the beginning of the tube at point A with the frequency decreasing along the length of the tube to point B. This has the effect of increasing the velocity of the water flowing through the tube, increasing its speed as it goes from point A to point B inside of the tube. An optional iris fan section 26, described below, can be used at the inlet.

Although illustrated in FIGS. 1A–C and 2 as extending to tube 14, 24, one of ordinary skill in the art will understand that a small clearance must exist between ribbon 12, 22 and tube 14, 24 so as to prevent interference.

Figure 3A:
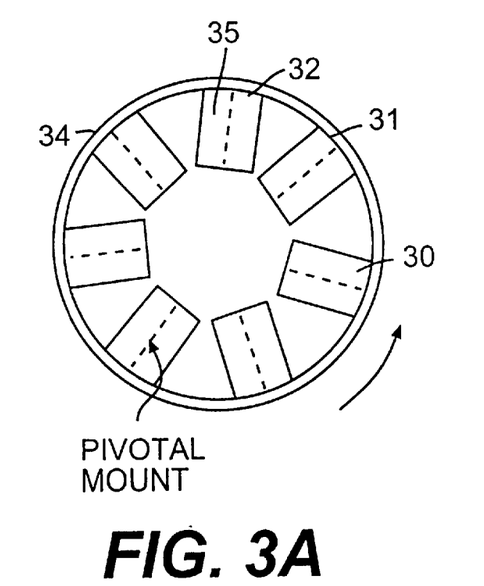
FIGS. 3A–B illustrate the iris fan for use with the peripheral design of the present invention.

Referring to FIGS. 3A, iris fan blades 30, 31, and 32 are suspended within a spinnable peripheral ring-like form 34 at the entrance and/or exit of the propulsion tube, moving inward like the iris of a camera toward the center of the open space through which water enters (or exits) the propulsion tube. As discussed above, a preferred application of the iris fan is for use when starting the system or when at low speeds, but which can then be retracted once a flow has been established. The iris fan blades are disposed in a single plane and can be rotated so as to vary their angle of attack. Thus, a series of blades initially allow water to enter the tube and, much like a propeller, propels the water down the length of the tube.

Figure 3B:
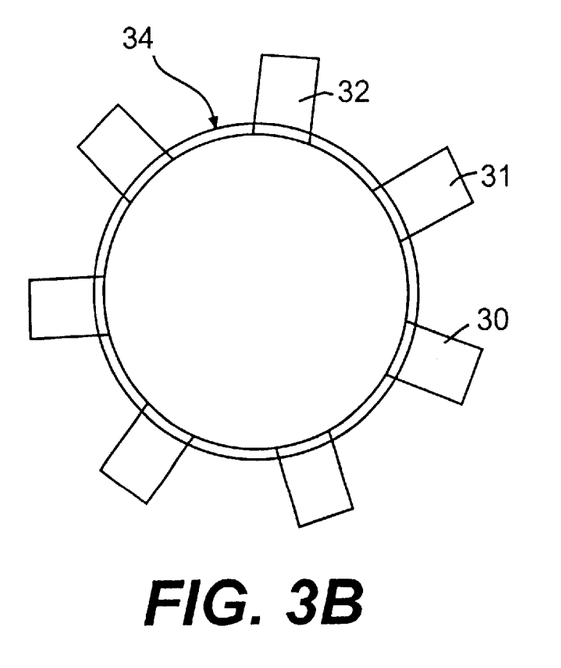

Referring to FIG. 3B, the iris-fan blade implementation is further illustrated. In this instance, iris fan blades 30, 31, and 32 are retracted from within their peripheral ring support 34 at the entrance to or exit from the propulsion tube, the blades no longer protruding into and now thereby out of the stream of water. Further, each of the separate blades can pivot about an axis to vary each blade's angle of attack with respect to the water flowing through the propulsion tube. This allows a variable adjustment to the speed of the water flowing through the propulsion tube solely by virtue of the rotation of the iris fan alone when the attached vessel is initially at a standstill or is moving slowly.

This "iris fan" type of concept, has blades attached to the periphery at approximately 90 degrees from the interior surface of the propulsion tube. These blades can retract out of the flow of water, thereby regulating the speed of the water that is proceeding through the propulsion tube. Each such blade or segment of the iris fan pivots on its axis. Such pivoting allows the angle of attack of the iris fan blades on the water in the propulsion tube to be changed as the iris fan blades, within their rotating ring, propel water rearward at an ever increasing speed. When the iris fan reaches its optimal rotational speed prior to cavitation, the blades can be turned to a neutral position and the iris fan rotation stopped. This will keep the propulsion system quiet at all speeds. A transition will have been effected prior to cessation of iris fan rotation, with engagement of propulsion by the continuous or segmented main ribbon band-like drive. Once the vessel is under way, the iris fan blades are designed to lay flat against the inside of their supporting peripheral ring or can be withdrawn peripherally into the hull of the vessel and out of the rearward moving stream of water.

The curved ribbon-like band may be made of metal, plastic, composite or other sturdy material. The frequency of the ribbon-like band may be fixed (static) or variable (dynamic or adjustable). It can be made variable by segmenting the ribbon into a contiguous length of hinged, interlocking, or overlapping blades, which are movable by reason of linkages or sliding splines (or other means to those skilled in the art) along the length of the ribbon band, or by linear elongation or contraction. The latter can be achieved by centrifugal effect, magnetic or hydraulic means, or other variable steppage. This can be designed where the outer edge of the ribbon-like band is attached, in the peripheral design, to outer rings or to a cylindrical or conical tube, located within the overall ribbon drive unit. In the central design, the innermost central edge of the ribbon-like band is attached to the central axle, which can include tubular sections that slide longitudinally or include slots within which the innermost edge attachment of the ribbon-like band can be adjusted to slide, or by other methods. The material of the ribbon-like vane can have limited but finite flexibility/extensibility, to permit adjustment as the forward speed of the vessel in response to increased velocity of water being driven to the rear by the ribbon drive.

In the circumstance of utilizing the centrifugal effect generated by the spinning ribbon drive, the centrifugal force upon the ribbon-like band itself while rotating will impart energy to the band, which would tend to uncoil. This tendency could be utilized if there were some limited flexibility and adjustability designed herein by virtue of choice of materials and method of attachment, as indicated in the preceding paragraph. An increasing centrifugal force from increased rate of rotation of the ribbon drive upon the ribbon-like band would tend to cause the curve of the band to uncoil. That is, the curve frequency would become less acute and more gradual with fewer coils per unit length; the helix angle of the curve would change from close to vertical to more close to the horizontal as defined by the central axis, thereby allowing water to flow through even more rapidly while the centrifugally reconfigured ribbon drive turns at a constant speed.

Analogously, for the effect of centrifugal force upon a coil, imagine two persons spinning one rope between them with each holding one end, versus one person alone holding one end of a rope and spinning it. The unattached, far-end of the rope will spin outwardly into a more gradual arc as it unwinds.

Figure 4:
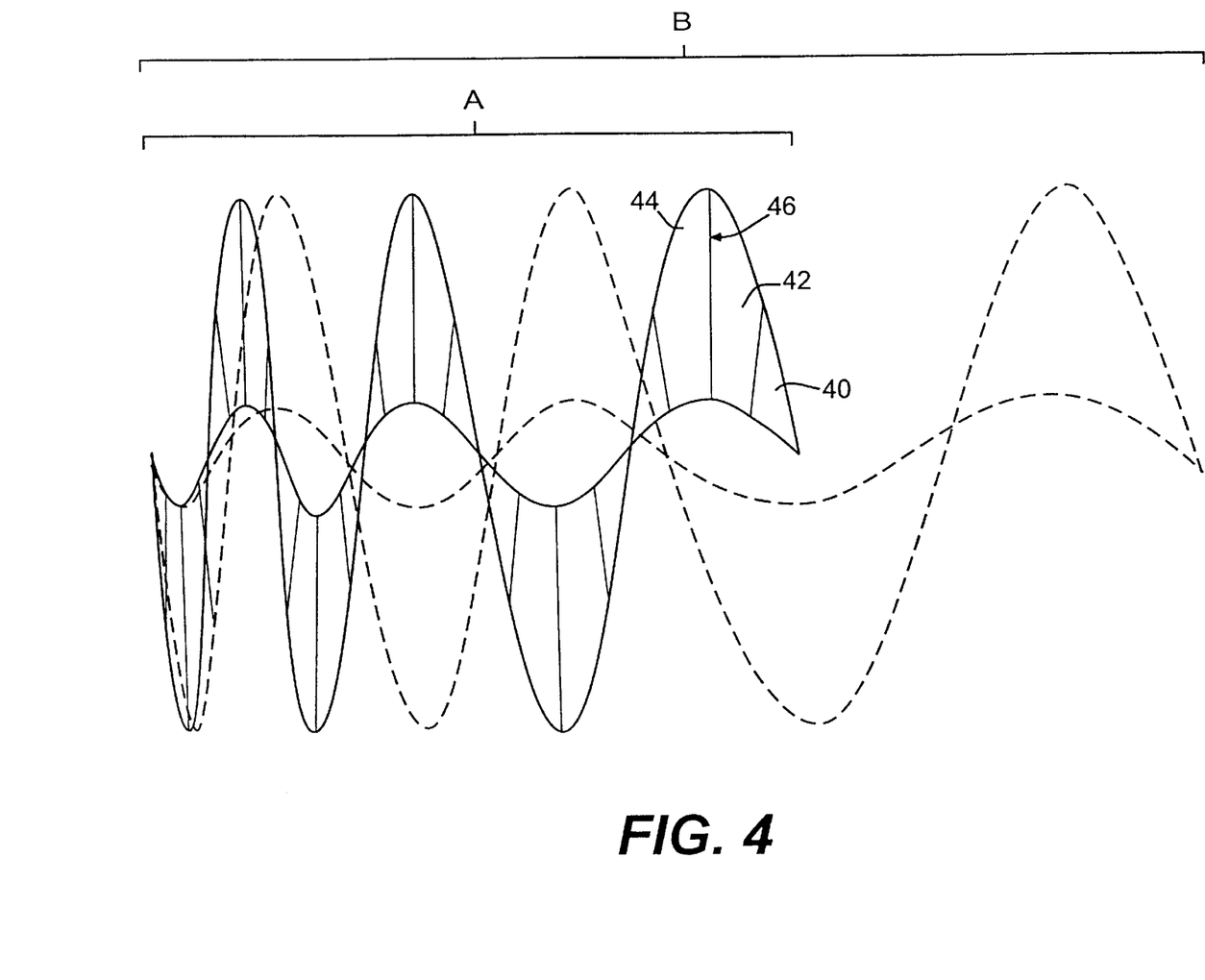
FIG. 4 illustrates an adjustable, segmented-vane ribbon drive design of the present invention.

Referring to FIG. 4, a variable or adjustable implementation of the ribbon-type band or vane for the ribbon drive propulsion system of the present invention is illustrated. An adjustable ribbon, in the form of a series of blades 40, 42, 44, as it would extend through a propulsion tube (not shown) is illustrated. This band could be used in either the peripheral design, by having an axially adjustable peripheral attachment means for the band, or used in the central design, by having an axially adjustable attachment means on the central axle. These blades form the vane and proceed in a coil-like design, with the frequency of the coils decreasing along the length of the axis in the direction of the water flow. The blades can be hinged, interlocking, or overlapping by any suitable means, as shown at 46, to form a unitary-type ribbon. The ribbon starts at a first length A and can be adjusted to a second length B, as shown by the dashed lines, thereby having effectively lower frequency coils. This type of adjustability would be useful for fine-tuning the propulsion system for speed, efficiency, noise reduction, etc.

As a further enhancement to the present invention, the propulsion tube may in fact be segmented with the individual segments of the propulsion tube rotating at different rates.

Figure 5:
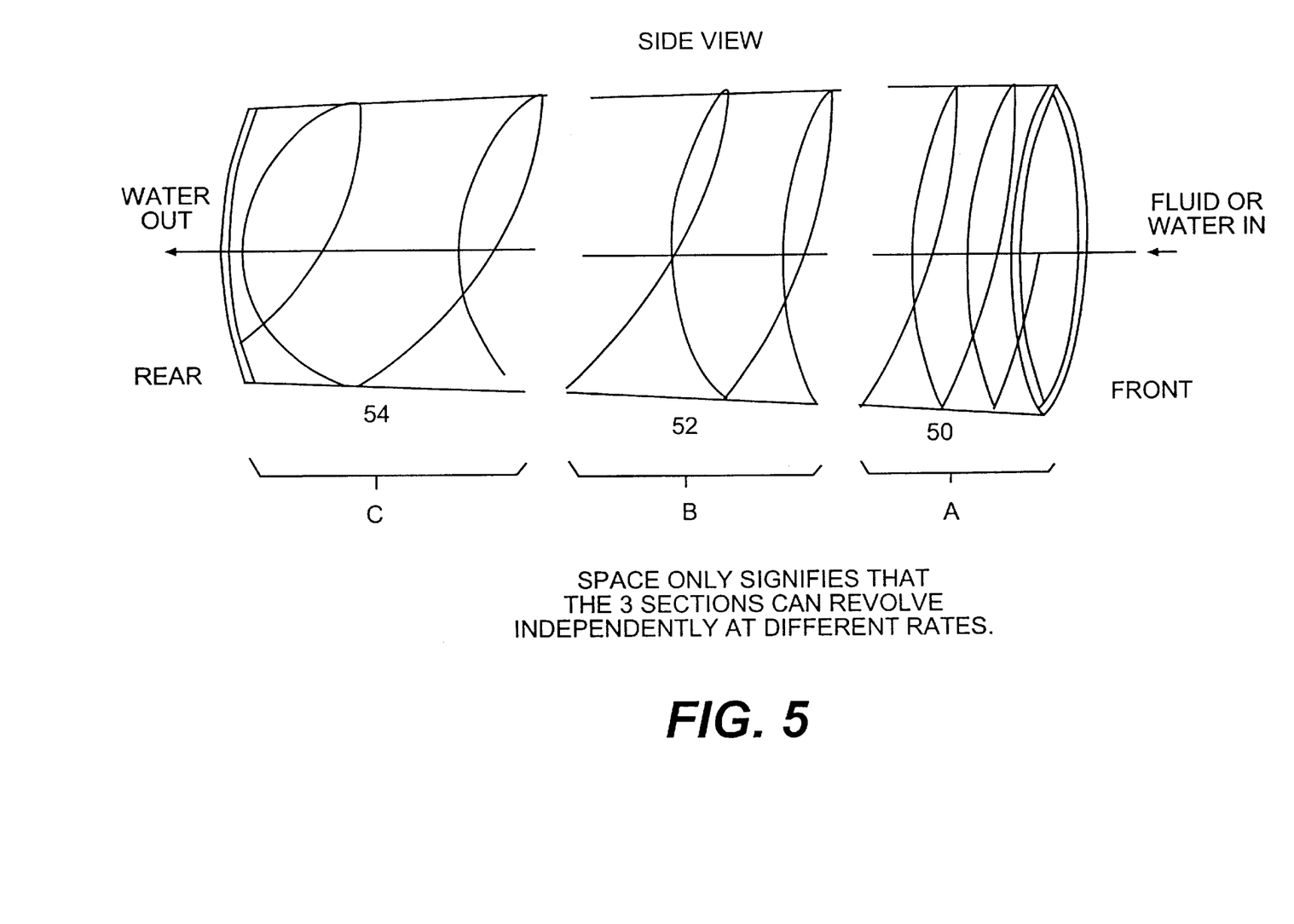
FIG. 5 illustrates a segmented drive system of the present invention.

Referring to FIG. 5, a segmented propulsion tube is shown. Section A, comprising a high frequency of coils 50 spinning at a particular rate, allows water to enter the propulsion tube from the point at A. Section B has a decreased frequency of propulsion coils 52, which tend to increase the water flow in that particular section. Again, both sections A and B can spin at different rates as appropriate. Finally, section C contains the lowest frequency of all of the coils 54, which imparts the final increment in speed to the water already moving at increased velocity consequent to sections A and B, and now about to exit the propulsion tube.

Figure 6A:
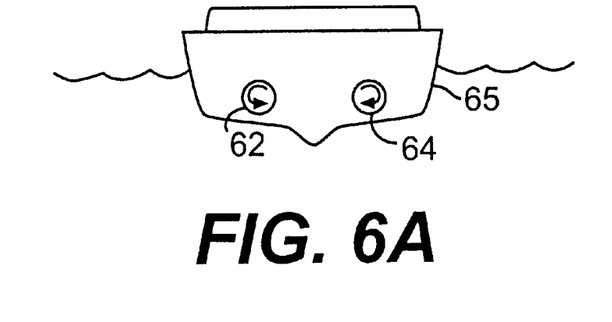
FIGS. 6A–C illustrate various configurations for employing the present propulsion system.
Figure 6B:
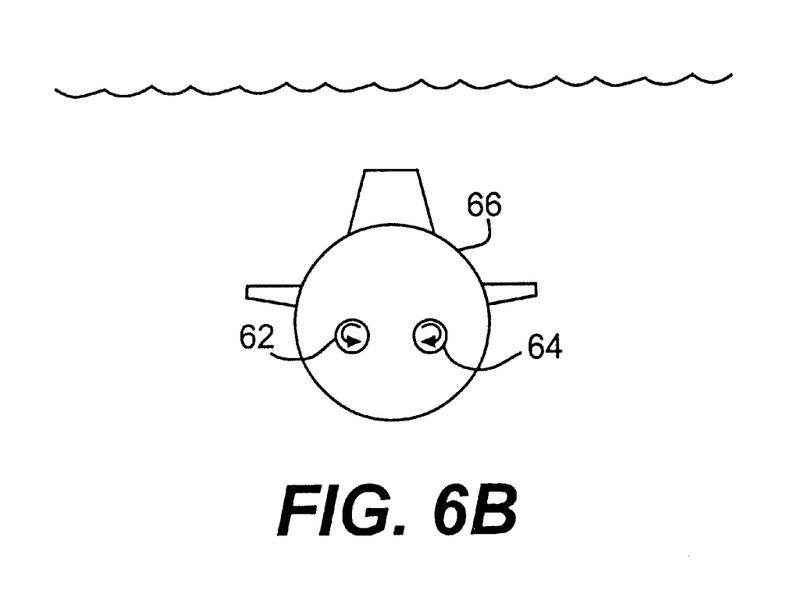
Figure 6C:
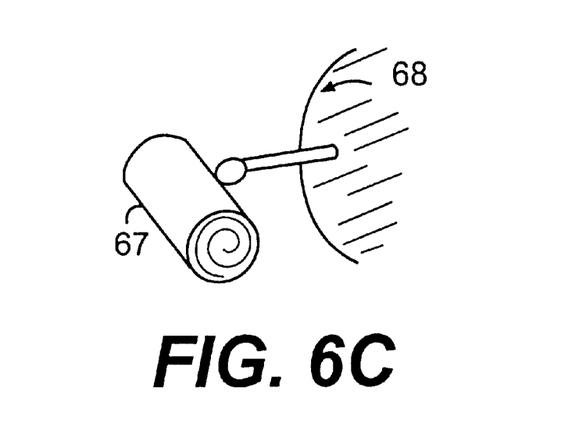

As shown in FIGS. 6A–C, the present invention can be employed in many configurations. FIGS. 6A discloses a counter rotating configuration of units 62, 64 for a surface vessel 65. FIGS. 6B discloses a counter rotating configuration of units 62, 64 for a submersible vessel 66. FIGS. 6C discloses an outboard-mounted, pivoting configuration of unit 67 for a surface or submersible vessel 68.

Although the propulsion tube is discussed in this embodiment as being in three parts, this is not meant as a limitation. It is expected that two part and more than three part propulsion tubes are within the scope of the present invention and will be useful to precise regulation of speed and noise of a submarine using this system. Further, the segmented tube can equally apply to both the peripheral and the central axis embodiments of the present invention.

The various sections of this multi-section propulsion tube can be driven at different rates, again to allow an infinite variation to the control of the water flowing through the tube.

However, regardless of the drive configuration, the essential element of design of the various embodiments or the present invention is the ribbon drive whose curve changes from a high frequency to a low frequency of coils per unit length. In appearance, the ribbon drive would, at the bow direction of a vessel, comprise a series of one or more tight curves of ribbon drive having an angle very nearly close to vertical at the entrance to the propulsion tube, with a much more gradual curve at an angle that might approximate 30 degrees to the horizontal at the stem end of the propulsion tube.

The initial tight curves (the high frequency section of the coil) provides an initial velocity of the water into the propulsion tube. As the rate of curve, that is the number of coils per unit length, decreases, the velocity of the water increases at it is driven sternward towards the rear portion of the ribbon drive and toward the rear of the propulsion tube-like space. As noted earlier, the entire ribbon drive is contained within a propulsion tube in order to accommodate the increased axial water velocity which is imparted to the water from the front to the rear of the tube and to give that water a more pronounced stem-ward direction.

The tight helix of ribbon drive (ie. high frequency of coils per unit length) initially brings water into the propulsion tube. As the water proceeds to the lower frequency, more gradual, longer curve of the helix, the axial water velocity speeds up sequentially.

ALTERNATIVE EMBODIMENTS

In an alternative embodiment of the present invention, the metal or composite materials of the forward higher frequency portion of the helix includes sections whose angle of attack upon the water entering the tube can be changed from a very steep to a neutral position. Thus, not withstanding the high frequency of the helix in the front of the tube, individual elements of that higher frequency helix can be changed to increase or decrease the flow of water through that section of the propulsion tube.

The lower frequency section of the propulsion system of the present invention is in general powered by the same central shaft as the front portion. This rearward portion with lower frequency of helix (i.e., fewer numbers of coils per unit length) increases the speed and energy of the water impelled rearward by the higher frequency portion of the forward part of the helix.

Thus, various embodiments of the present invention allow for varying frequency of coils per unit length decreasing from the front of the propulsion tube to the back.

In yet another embodiment of the present invention, there may be a combination of propulsion types in different sections. For example, a first section may have iris fan blades, while the second section may have a central axle design while the third section has a peripheral ribbon drive.

Individual elements comprising all portions of the ribbon drive can be varied in their respective angle of attack to increase or decrease the speed with which water is traveling through the propulsion tube.

One alternative embodiment of the present invention is a one piece rotating unit with a ribbon drive twisted into a corkscrew like shape, with a tighter coil, (i.e., more coils per unit length) toward the bow of the vessel with a gradual decrease of the frequency of the coils toward the stern or rear of the vessel. Such a unit would rotate around a linear central axis parallel to the long axis of the vessel. Alternatively, such a ribbon could be attached peripherally to the inner wall of a rotating tube-like or ring-like structure.

Another alternative embodiment of the present invention is a two-piece unit with a shorter forward section attached within a peripheral ring and rotating within that peripheral ring, the shorter forward section having a higher frequency coil or ribbon structure within that front section. A second longer rearward section of the unit would consist of a gradual ribbon-like coil decreasing in frequency from bow to stern and rotating around a central linear axis parallel to the long axis of the vessel. This two section embodiment of the present invention can have each section move at different rotational speeds, in the same direction, in order to give maximum flexibility to the selection of the desired speed of the water running through the propulsion tube and hence the speed of the vessel.

In the application of the multi-section unit, the initial forward section begins to first rotate to begin to bring water into the propulsion tube. That water impinges upon the lower frequency coils of the ribbon drive in the rearward section, initiating and imparting to the rearward section a rotational movement. Once forward motion of the vessel has begun and reached a predetermined minimum speed, principally powered by the forward section of the ribbon drive, the rearward section of the ribbon drive is engaged, thereby providing additional force to the water that passes through the propulsion tube with the resultant force adding additional speed to the: vessel's forward motion.

It is anticipated that numerous different configurations of ribbon drive will be possible. For example, the rate of rotation of individual sections of the ribbon drive system, the transition and the curve frequency of the ribbon drive from front to rear, the height and length of the ribbon itself can vary, cylindrical or conical space of the propulsion tube can vary, all of which can join together to affect the final speed of the vessel.

As yet an alternative embodiment, a three-piece unit is anticipated. In such a unit, an iris fan section would be at both the bow or forward area of the propulsion tube and at the rear of the propulsion tube with a ribbon-like band as the ribbon drive in the center section. In this instance, both iris fans would initiate rearward movement of the water, and thus the initial forward motion of the vessel would be effected by the iris fans. Once a particular speed of forward motion is achieved, the central portion of the ribbon drive can be engaged to add additional forward speed to the vessel. The iris fans might then be disengaged It is also anticipated that three or more sections of such a ribbon drive can be created as well. Having more sections allows the speed of the water in the propulsion tube to be tuned to achieve optimum angles and lengths of ribbon drive components for the maximum transit speed of the water increasing the water's speed as it reaches the rear of the outlet. For example, the first section of the drive can have the tightest curve (i.e., highest frequency of coils) of the ribbon drive. The second and immediate section could have a more modest curve in order to accommodate the already speeded up water coming from the first section. Finally, a third section, although this is not meant as a limitation, can have the most gradual curve of the three pieces of the ribbon drive unit, allowing water to exit the tube at a high velocity.

The individual sections of the propulsion system could be supplied with power from the same or different power units. Further, it is anticipated that the speed of rotation of the individual sections of the propulsion system will vary in order to finely tune the velocity of the water proceeding through the propulsion tube.

In addition, certain refinements to the present invention will also enhance its usefulness. For example, the propulsion tube may be a cylinder or may be conically shaped. A conical shape narrowing toward the rear/stem would force water moving rearward to exit at an increased velocity.

In addition, the ribbon drive can be used as a single unit, or there may be multiple ribbon drives such as a counter-rotating pair in order to provide the necessary thrust and stable motion through fluid with a minimal reactive rotatory torque upon the hull and control surfaces. This will assist in rudder control of the vessel. Additionally, the drives themselves may be mounted in an articulated manner to provide motion control, such as when mounted in an outboard manner to act as a thruster.

This ribbon drive of the present invetion finds application in a variety of technologies. For example, in any endeavor where a fluid must be moved from one location to another, the present invention may be employed. For example, compressor pumps for refrigeration move fluids for cooling purposes. The present invention may be used for such fluid movement.

In hydroelectric projects where movement of a turbine causes electrical current, the novel design of the ribbon drive of the present invention will find use operating in reverse to rotate a shaft to operate a generator.

In pumps of all kinds, water or other fluids must be moved for utilitarian or decorative purposes. In such cases, the ribbon drive of the present invention can be used.

Turbine drive systems can also benefit from the geometry of the ribbon drive and iris fan embodiments of the present invention. Combustion can be the source of drive for the ribbon drive embodiments of the present invention leading to more efficient and rapid movement of air and gases through the propulsion tube.

It will thus be appreciated by those skilled in the art that further uses and embodiments of the varying frequency ribbon drive of the present invention will be apparent from a review of the specification without departing from the scope of the invention as disclosed.

I claim:

1. A propulsion system for water-borne vessels comprising:
   a propulsion tube having an intake at a first end and an outlet at a second end;
   at least one rotatable ribbon formed of coils extending in a helical manner from the first end to the second end of the tube, wherein a frequency of coils per unit length of tube decreases from the first end to the second end of the tube;
   means for providing additional water to low pressure regions inside said propulsion tube;
   drive means for rotating the ribbon.

2. The propulsion system for water-borne vessels of claim 1, wherein said ribbon is attached at an outer peripheral edge to the tube and extends at an outer peripheral edge at least to an inner surface of the tube and the drive means rotates the tube.

3. The propulsion system for water-borne vessels of claim 2, wherein the ribbon extends radially inward from the tube a length less than a radius of the tube to form a central, axial opening in the ribbon which acts as said means for providing additional water.

4. A propulsion system for water-borne vessels comprising:
   a propulsion tube having an intake at a first end and an outlet at a second end;
   at least one rotatable ribbon formed of coils extending in a helical manner from the first end to the second end of the tube, wherein a frequency of coils per unit length of tube decreases from the first end to the second end of the tube; and
   drive means for rotating the ribbon, wherein said ribbon is adjacent to a retractable iris fan formed of a plurality of blades, each blade being radially adjustable.

5. A propulsion system for water-borne vessels comprising:
   a propulsion tube having an intake at a first end and an outlet at a second end;
   at least one rotatable ribbon formed of coils extending in a helical manner from the first end to the second end of the tube, wherein a frequency of coils per unit length of tube decreases from the first end to the second end of the tube; and
   drive means for rotating the ribbon, wherein said ribbon is formed of a plurality of adjustable, contiguous vane segments.

6. The propulsion system for water-borne vessels of claim 5, wherein said plurality of vane segments are axially adjustable.

7. The propulsion system for water-borne vessels of claim 5, wherein said pluraity of vane segments are flexible in response to applied force.

8. The propulsion system for water-borne vessels of claim 2, comprising plural axially and serially oriented sections, each section having a separate tube and ribbon.

9. The propulsion system for water-borne vessels of claim 8, further comprising each section having a separate drive means.

10. The propulsion system for water-borne vessels of claim 2, comprising plural, counter-rotating units, each unit having a separate tube and ribbon.

11. The propulsion system for water-borne vessels of claim 1, wherein said drive means includes a central, axial shaft in said tube and said ribbon is fixed at an inner edge to said shaft and extends radially outward to form an outer edge adjacent an inner wall of the tube.

12. The propulsion system for water-borne vessels of claim 11, comprising plural axially connected sections, each section having a separate drive means and ribbon.

13. The propulsion system for water-borne vessels of claim 11, wherein said means for providing additional water comprises slipstream channels with outlets in said tube wall, wherein said water is either drawn in by pressure differences or pumped in.

14. The propulsion system for water-borne vessels of claim 11, comprising plural, counter-rotating units, each unit having a separate ribbon.

15. The propulsion system for water-borne vessels of claim 1, wherein said water-borne vessel is a surface vessel.

16. The propulsion system for water-borne vessels of claim 1, wherein said water-borne vessel is a submersible vessel.

17. The propulsion system for water-borne vessels of claim 1, wherein said propulsion system is movable relative to said water-borne vessel.

18. The propulsion system for water-borne vessels of claim 1, wherein said ribbon is cupped to have a concave curvature in a direction facing the outlet.

19. The propulsion system for water-borne vessels of claim 1, wherein the ribbon is formed of rigid material selected from the group consisting of metal, composite materials, plastic polymer, and ceramic.

20. The propulsion system for water-borne vessels of claim 1, comprising a plurality of ribbons mounted within said tube.

21. A propulsion method for water-borne vessels comprising:
- providing the water-borne vessel with a propulsion tube having an intake at a first end and an outlet at a second end;
- rotating at least one ribbon formed of coils extending in a helical manner from the first end to the second end of the tube, wherein a frequency of coils per unit length of tube decreases from the first end to the second end of the tube;
- collecting water at the first end;
- increasing an axial component of momentum of the water with the rotating ribbon;
- adding water to low pressure regions within said tube; and
- ejecting water from the second end to provide propulsion to the vessel.

22. The propulsion method for water-borne vessels of claim 21, wherein said ribbon is formed to extend at an outer peripheral edge at least to an inner surface of the tube and the ribbon is rotated by rotating the tube.

23. The propulsion method for water-borne vessels of claim 22, wherein the ribbon is attached at an outer peripheral edge to the tube and extends radially inward from the tube a length less than a radius of the tube to form a central, axial opening in the ribbon to allow adding water to low pressure regions.

24. The propulsion method for water-borne vessels of claim 21, wherein said ribbon is attached to a hollow central axle having spaced perforations to allow adding water to low pressure regions.

25. A propulsion method for water-borne vessels comprising:
- providing the water-borne vessel with a propulsion tube having an intake at a first end and an outlet at a second end;
- rotating at least one ribbon formed of coils extending in a helical manner from the first end to the second end of the tube, wherein a frequency of coils per unit length of tube decreases from the first end to the second end of the tube;
- collecting water at the first end;
- increasing an axial component of momentum of the water with the rotating ribbon; and
- ejecting water from the second end to provide propulsion to the vessel, further comprising forming said ribbon from a plurality of adjustable, contInguous vane segments.

26. The propulsion method for water-borne vessels of claim 25, wherein said plurality of vane segments are axially adjustable to change effective coil frequency.

27. The propulsion method for water-borne vessels of claim 25, further comprising forming said vane segments to flex in response to applied force.

28. The propulsion method for water-borne vessels of claim 22, comprising providing plural axially connected sections, each section having a separate tube and ribbon.

29. The propulsion method for water-borne vessels of claim 28, further comprising each section having a separate drive means.

30. The propulsion method for water-borne vessels of claim 22, comprising providing plural, counter-rotating units, each unit having a separate tube and ribbon.

31. The propulsion method for water-borne vessels of claim 21, wherein a central, axial shaft is provided in said tube to rotate the ribbon and said ribbon is fixed at an inner edge to said shaft and extends radially outward to form an outer edge adjacent an inner wall of the tube.

32. The propulsion method for water-borne vessels of claim 31, comprising providing plural axially connected sections, providing each section with a separate ribbon.

33. The propulsion method for water-borne vessels of claim 31, further comprising providing each section with a separate tube.

34. The propulsion method for water-borne vessels of claim 31, comprising providing plural, counter-rotating units, providing each unit with a separate ribbon.

35. The propulsion method for water-borne vessels of claim 21, wherein said water-borne vessel is a surface vessel.

36. The propulsion method for water-borne vessels of claim 21, wherein said water-borne vessel is a submerssible vessel.

37. The propulsion method for water-borne vessels of claim 21, further compising mounting said tube so as to be movable relative to said water-borne vessel.

38. The propulsion method for water-borne vessels of claim 21, further compising adding additional water to the interior of the tube at a low pressure region to decrease cavitation and increase thrust.

39. The propulsion system for water-borne vessels of claim 1, wherein the tube or a portion varies in diameter.

40. The propulsion method for water-borne vessels of claim 21, further comprising providing a varied diameter to at least a portion of the propulsion tube.

41. The propulsion method for water-borne vessels of claim 21, further comprising providing a plurality of ribbons within said propulsion tube.

42. The propulsion method for water-borne vessels of claim 31, further comprising providing a hollow interior and spaced perforations to said shaft to allow adding water to low pressure regions.

43. The propulsion system for water-borne vessels of claim 11, wherein said shaft is hollow and includes spaced perforations to form said means for providing additional water.

* * * * *

UNITED STATES PATENT AND TRADEMARK OFFICE
CERTIFICATE OF CORRECTION

PATENT NO. : 6,431,926 B1
DATED : August 13, 2002
INVENTOR(S) : Jonathan B. Rosefsky It is certified that error appears in the above-identified patent and that said Letters Patent is hereby corrected as shown below:

<u>Column 2,</u>
Line 59, "conter" should be -- counter --;

<u>Column 3,</u>
Line 61, "Considereing" should be -- Considering --;

<u>Column 5,</u>
Line 33, "10" should be -- 16 --;

<u>Column 6,</u>
Line 9, "spinning containment tube turning" should be -- containment tube spinning --;
Line 37, "axel" should be -- axle --;

<u>Column 7,</u>
Line 54, "in response" should be -- responds --;

<u>Column 8,</u>
Line 67, "or" should be -- of --;

<u>Column 9,</u>
Lines 8 and 20, "stem" should be -- stern --;

<u>Column 10,</u>
Line 24, the ":" after "the" should be deleted;

<u>Column 11,</u>
Line 1, "stem" should be -- stern --; and

UNITED STATES PATENT AND TRADEMARK OFFICE
CERTIFICATE OF CORRECTION

PATENT NO. : 6,431,926 B1
DATED : August 13, 2002
INVENTOR(S) : Jonathan B. Rosefsky It is certified that error appears in the above-identified patent and that said Letters Patent is hereby corrected as shown below:

<u>Column 12,</u>
Line 24, "pluraity" should be -- plurality --.

Signed and Sealed this

Fifteenth Day of October, 2002

Attest:

Attesting Officer

JAMES E. ROGAN
*Director of the United States Patent and Trademark Office*